United States Patent [19]
Jung

[11] Patent Number: 5,889,854
[45] Date of Patent: Mar. 30, 1999

[54] TECHNIQUE FOR COMPENSATING FOR SIGNAL ATTENUATION ON A TELEPHONE LINE

[75] Inventor: Yeong-Cheol Jung, Kwacheon, Rep. of Korea

[73] Assignee: SamSung Electronics Co., Ltd., Suwon, Rep. of Korea

[21] Appl. No.: 881,564

[22] Filed: Jun. 24, 1997

[30] Foreign Application Priority Data

Jun. 26, 1996 [KR] Rep. of Korea .................. 24075/1996

[51] Int. Cl.⁶ ............................... H04M 1/00; H04B 3/00
[52] U.S. Cl. .......................... 379/390; 379/400; 379/401; 379/399; 379/340; 381/77; 381/78; 381/82
[58] Field of Search ...................................... 379/338, 394, 379/395, 377, 347, 390, 400, 409, 340; 381/104, 82, 77, 78

[56] References Cited

U.S. PATENT DOCUMENTS

| | | | |
|---|---|---|---|
| 3,748,400 | 7/1973 | Ritz et al. | 379/392 |
| 3,851,108 | 11/1974 | Freimanis | 379/378 |
| 3,903,378 | 9/1975 | Lee et al. | 379/400 |
| 4,002,852 | 1/1977 | Martin | 379/395 |
| 4,228,323 | 10/1980 | Feiner et al. | 379/400 |
| 4,277,655 | 7/1981 | Surprenant | 379/340 |
| 4,453,037 | 6/1984 | Terry | 379/400 |
| 4,453,038 | 6/1984 | Eberhardt et al. | 379/395 |
| 4,538,032 | 8/1985 | Ballatore et al. | 379/398 |
| 4,720,856 | 1/1988 | Pace et al. | 379/390 |
| 5,274,703 | 12/1993 | Haughton et al. | 379/401 |
| 5,321,746 | 6/1994 | Bader | 379/390 |
| 5,396,553 | 3/1995 | Haughton et al. | 379/401 |
| 5,422,950 | 6/1995 | Miller et al. | 379/399 |

*Primary Examiner*—Daniel S. Hunter
*Assistant Examiner*—Charles N. Appiah
*Attorney, Agent, or Firm*—Robert E. Bushnell, Esq.

[57] ABSTRACT

An apparatus compensates for an attenuation of a signal on a telephone line in a communication system connected to the telephone line via a transformer. A photo coupler detects a loop current at a primary winding of the transformer. A controller generates switching control signals corresponding to an output of the photo coupler based on a predetermined switching table, and controls an overall operation of the communication system by receiving coding data. A level amplifier having different gains amplifies a signal at a secondary winding of the transformer by the gain corresponding to the switching control signal. A coder codes an output from the level amplifier to generate the coding data.

5 Claims, 2 Drawing Sheets

TECHNIQUE FOR COMPENSATING FOR SIGNAL ATTENUATION ON A TELEPHONE LINE

CLAIM OF PRIORITY

This application makes reference to, incorporates the same herein, and claims all benefits accruing under 35 U.S.C. §119 from an application for APPARATUS AND METHOD OF COMPENSATING SIGNAL ATTENUATION ON TELEPHONE LINE earlier filed in the Korean Industrial Property Office on the 26$^{th}$ day of Jun. 1996 and there duly assigned Ser. No. 24075/1996, a copy of which application is annexed hereto.

BACKGROUND OF THE INVENTION

1. Field of the Invention

The present invention relates to a communication system connected to a telephone line, and more particularly to a technique for amplifying a signal on a telephone line according to a loop current detected from the telephone line.

2. Description of the Related Art

In general, communication systems such as a telephone, a facsimile machine, a digital telephone answering device (TAD), a digital speakerphone, etc. are connected to a telephone line. Further, it is well known that a signal intensity at the terminals connected to the telephone line is dependent on the distance from a switching system. Since an impedance of the common telephone line made of copper varies according to the length thereof, the relative current with respect to a constant DC current, i.e., the loop current, also varies according to the distance between the communication system and the switching system. The variation of the loop current corresponds to a variation of the distance. From this, it can be understood that a variation of the signal intensity according to the distance from the switching system is proportional to the variation of the loop current. Therefore, a user of the telephone distanced far away from the switching system can hardly hear the called party. In order to solve such problem, it is necessary to compensate for an attenuation of the signal on the telephone line.

The Feiner et al., Terry, Martin, and Eberhardt et al. patents, U.S. Pat. Nos. 4,228,323, 4,453,037, 4,002,852, and 4,453,038, entitled respectively Variable Loop Length Compensated Barrier Circuit, Loop Length Compensation Circuit, Electronic Telephone Network, and Circuit Arrangement For Producing Control Means From Line Current, each disclose telephone systems in which the amplification is varied according to the measured loop current. However, none of these patents teaches or suggests the use of a switching table as in the present invention.

The following additional patents each disclose features in common with the present invention but are not as pertinent as the patents discussed above: U.S. Pat. No. 3,903,378 to Lee et al, entitled Arrangement For Controlling The Gain Of Two-Way Amplifiers In Accordance With Loop Lengths, U.S. Pat. No. 5,321,746 to Bader, entitled Adjustable Gain Range Current Mirror, and U.S. Pat. No. 4,720,856 to Pace et al, entitled Control Circuit Having A Direct Current Control Loop For Controlling The Gain Of An Attenuator.

SUMMARY OF THE INVENTION

It is therefore an object of the present invention to provide a technique for compensating for a signal attenuation on a telephone line, by detecting a loop current of the telephone line and amplifying the signal intensity of the telephone line according to an attenuation of the loop current based upon a switching table.

According to an aspect of the present invention, an apparatus for compensating for an attenuation of a signal on a telephone line in a communication system connected to the telephone line, detects a loop current of the telephone line and amplifies the signal on the telephone line by a gain corresponding to the detected loop current based upon a switching table. The gain is varied according to an amount of the loop current.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
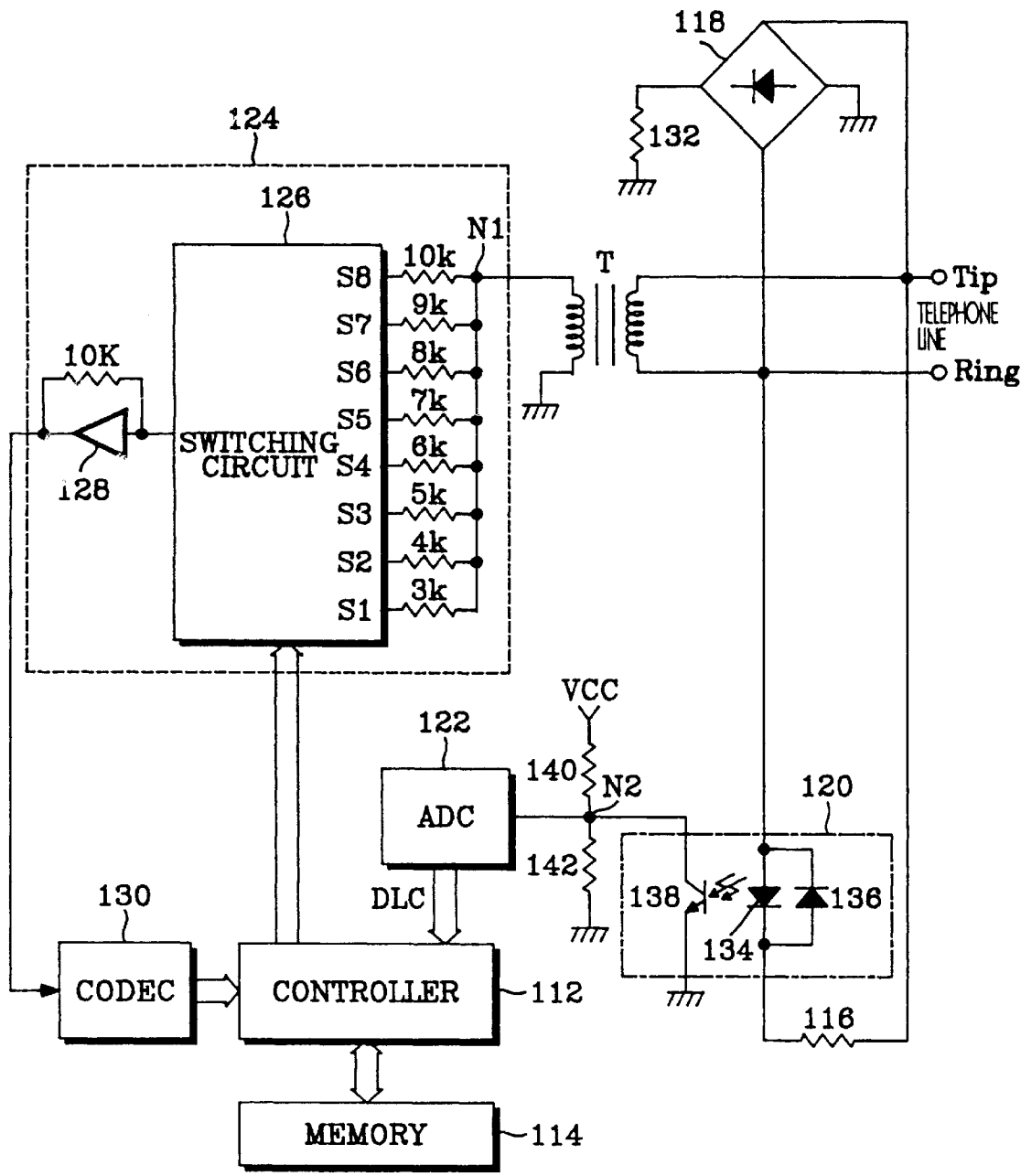
FIG. 1 is a system block diagram showing an apparatus for compensating for a signal attenuation on a telephone line in a communication system connected to a telephone line according to an embodiment of the present invention.

A preferred embodiment of the present invention will be described in detail hereinbelow with reference to the attached drawings, in which the like reference numerals used throughout the specification represent the like elements.

A term "switching table" used throughout the specification refers to switching control signals associated with reference levels which have been previously set based upon the attenuation according to the distance from the switching system.

Referring to FIG. 1, there is illustrated a system block diagram showing an apparatus for compensating for a signal attenuation on a telephone line in a communication system connected to a telephone line according to an embodiment of the present invention. As illustrated, a bridge diode 118 is connected in parallel to the telephone line to rectify a loop current on the telephone line. A photo coupler 120 detects the loop current on the telephone line to convert it into a voltage. The photo coupler 120 includes light emitting diodes (LEDs) 134 and 136 whose light emission is varied according to an amount of the loop current, and a phototransistor 138 which is turned on in response to the light emitted from the LEDs 134 and 136. A collector of the phototransistor 138 is coupled to a node N2 formed at a conjunction of resistors 140 and 142 connected in series between a supply voltage Vcc and ground. A voltage at the node N2 is proportional to the loop current.

An ADC (analog-to-digital converter) 122 converts the voltage at the node N2 into a digital loop current (DLC). A memory 114 includes a predetermined switching table and stores various data and software programs for operating the system. A controller 112 generates a switching control signal corresponding to the digital loop current based upon the switching table. Further, the controller 112 processes the input coding data and stores it in the memory 114, to control an overall operation of the system.

A level amplifier 124 is coupled to a secondary winding of a transformer T whose primary winding is connected to the telephone line. The level amplifier 124 includes a switching circuit 126 and an operational amplifier 128. The switching circuit 126 selectively connects one of resistors 3K–10K to the operational amplifier 128 according to the switching control signal generated by the controller 112, so as to transfer the signal received through the selected one of the resistors 3K–10K to the operational amplifier 128. The operational amplifier 128 amplifies the signal output from the switching circuit 126. A gain of the operational amplifier 128 is determined by a resistor 10K coupled thereto and the selected one of the resistors 3K–10K coupled in common to a node N1. Namely, the gain of the operational amplifier 128 is represented by 10K/(resistance of the resistor coupled to the node N1).

A coder 130 codes the analog signal amplified by the operational amplifier 128 into digital data, to generate the coding data.

Figure 2:
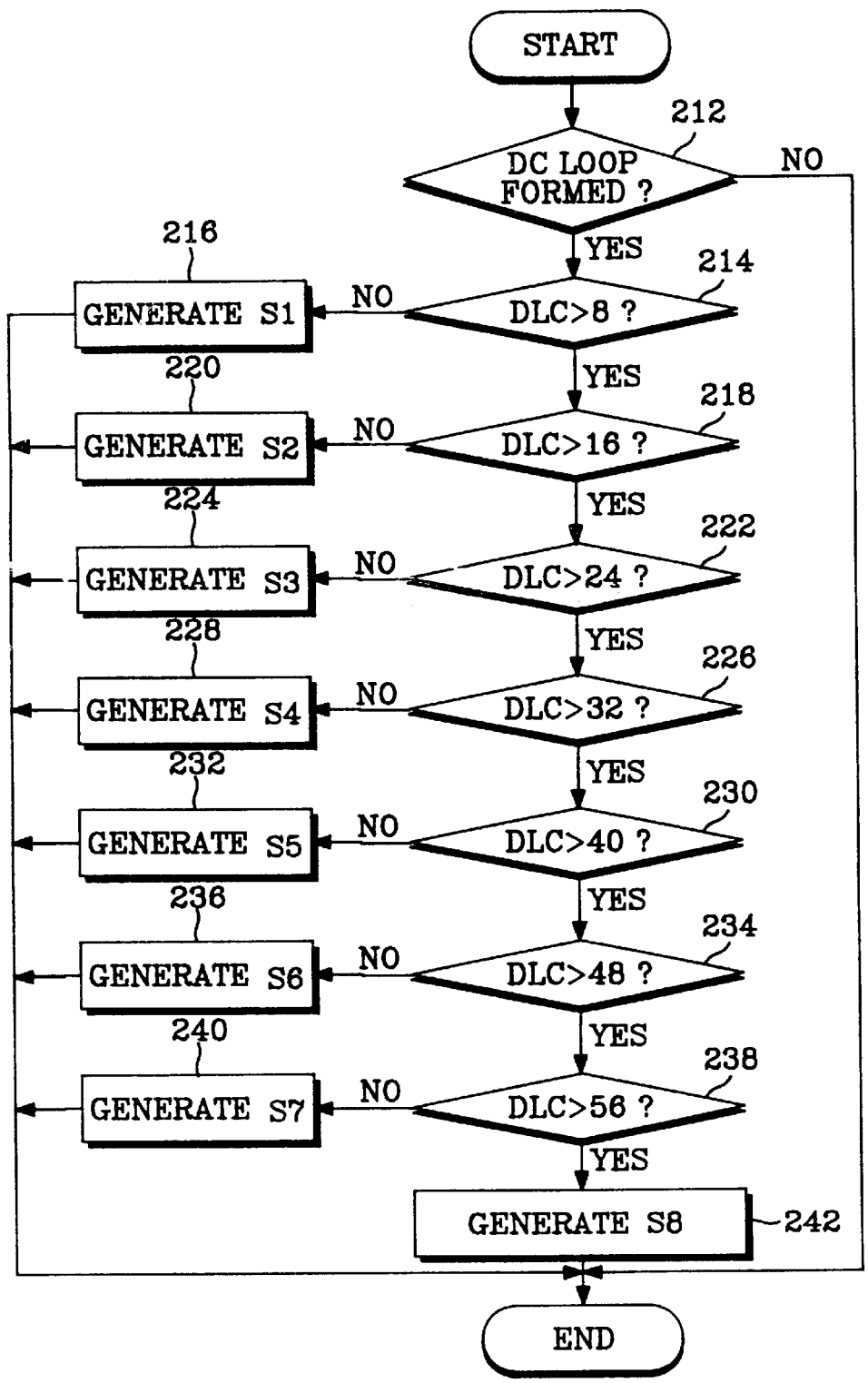
FIG. 2 is a flowchart illustrating a technique for compensating for a signal attenuation on a telephone line in a communication system connected to a telephone line according to an embodiment of the present invention.

Referring to FIG. 2, there is shown a flowchart illustrating a technique for compensating for the signal attenuation on the telephone line in a communication system connected to the telephone line according to an embodiment of the present invention. The operations of the present invention will be described hereinbelow with reference to FIGS. 1 and 2.

As a communication path is formed, a DC loop is formed. Then, the bridge diode 118 generates an output voltage according to the loop current. The output voltage is supplied to the photocoupler 120 which is coupled in parallel to the bridge diode 118. A resistor 116 coupled to the photocoupler 120 has a very high resistance, so that the current flow through the photocoupler 120 is relatively small when compared with the current flow through the bridge diode 118. Therefore, it does not have an influence on the DC characteristics of the switching system.

If the current flows through the LEDs 134 and 136 of the photocoupler 120, the transistor 138 is turned on and varies the voltage level at the node N2 according to an amount of an emitter-collector current. It should be noted that the transistor 138 operates in a linear region, and not in the saturation or cut-off region.

Then, the ADC 122 converts the voltage level at the node N2 into the digital loop current (DLC). The controller 112 receives the DLC to look up the switching table. Namely, the controller 112 checks, at step 212, whether or not the DC loop is formed. If the DC loop is formed, the controller 112 executes step 214. If the DLC is less than 8 at step 214, the controller 112 generates a first switching control signal S1 at step 216. At step 218, if the DLC is greater than 8 and less than 16, the controller 112 generates a second switching control signal S2 at step 220. Similarly, if the DLC is greater than 16 and less than 24 at step 222, the controller 112 generates a third switching control signal S3 at step 224. If the DLC is greater than 24 and less than 32 at step 226, the controller 112 generates a fourth switching control signal S4 at step 228. If the DLC is greater than 32 and less than 40 at step 230, the controller 112 generates a fifth switching control signal S5 at step 232. If the DLC is greater than 40 and less than 48 at step 234, the controller 112 generates a sixth switching control signal S6 at step 236. Further, if the DLC is greater than 48 and less than 56 at step 238, the controller 112 generates a seventh switching control signal S7 at step 240. Finally, if the DLC is greater than 56 at step 238, the controller 112 generates an eighth switching control signal S8 at step 242.

The first to eighth switching control signals S1–S8 are provided to the switching circuit 126. If for example, the first switching control signal S1 is received from the controller 112, the switching circuit 126 switches the output terminal thereof to the switching terminal S1. Then, the operational amplifier 128 amplifies the signal received from the secondary winding of the transformer T via the resistor 3K and transfers the output to the coder 130. It can be appreciated that the gain of the operational amplifier 128 is varied according to the first to eighth switching control signals S1–S8. Namely, the operational amplifier 128 has the largest gain in response to the first switching control signal S1 and the smallest gain in response to the eighth switching control signal S8. Therefore, when the telephone line is very long, which results in a great attenuation of the telephone signal, the switching circuit 126 connects the operational amplifier 128 to the switching terminal S1.

As described in the foregoing, the apparatus according to the present invention detects an attenuation of the input signal of a communication system distanced far away from a switching system, and compensates for the attenuation by using an amplifier. Conventionally, in case of the digital TAD distanced far away from the switching system, a voice message recorded in the absence of the user may be inaudible or unclear even though the digital TAD is set at a high sensitivity. However, with use of the apparatus according to the present invention, the digital TAD amplifies the voice before recording so that the voice may be recorded clearly. Therefore, a communication system employing the present invention can improve the voice quality, thereby increasing a reliability of the products.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An apparatus for compensating for an attenuation of a signal on a telephone line in a communication system connected to the telephone line via a transformer, comprising:

a detector for detecting a loop current at a primary winding of the transformer;

a controller for generating a switching control signal corresponding to an output of the detector based on a predetermined switching table, and for controlling an overall operation of said communication system by receiving coding data;

a level amplifier having different gains, for amplifying a signal at a secondary winding of the transformer by a gain corresponding to the switching control signal; and a coder for coding an output from the level amplifier to generate said coding data.

2. An apparatus for compensating for an attenuation of a signal on a telephone line according to claim 1, said level amplifier comprising:

a switching circuit including a plurality of resistors with different resistances, for coupling an output of the secondary winding of the transformer to one of said resistances according to the switching control signal; and an amplifier for amplifying the output of said switching circuit.

3. An apparatus for compensating for an attenuation of a signal on a telephone line according to claim 1, said detector comprising:

a voltage converter for converting the loop current into a voltage output; and an analog-to-digital converter for converting the voltage output from the voltage converter into a digital loop current.

4. A method of compensating for an attenuation of a signal on a telephone line in a communication system connected to the telephone line, said communication system including a predetermined switching table and a level amplifier with different gains, comprising the steps of:

detecting a loop current of the telephone line; and amplifying the signal on the telephone line by a gain corresponding to the detected loop current based upon the switching table.

5. A method of compensating for an attenuation of a signal on a telephone line in a communication system including a predetermined switching table, a level amplifier connected to a secondary winding of a transformer having a primary winding which is connected to the telephone line, said level amplifier having different gains, a coder for coding an output of the level amplifier, and a controller for controlling an overall operation of the communication system by using an output of said coder, comprising the steps of:

detecting a loop current of the telephone line; and generating switching control signals, so as to select one of the different gains according to the detected loop current based upon the switching table.

\* \* \* \* \*